(12) United States Patent
Grimm et al.

(10) Patent No.: US 6,409,258 B1
(45) Date of Patent: Jun. 25, 2002

(54) VEHICLE ROOF MODULE WITH INTEGRAL SUNROOF UNIT

(75) Inventors: Rainer Grimm; Horst Böhm, both of Frankfurt (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/672,403

(22) Filed: Sep. 28, 2000

(30) Foreign Application Priority Data

Sep. 29, 1999 (DE) ......................................... 199 46 804

(51) Int. Cl.[7] .................................................. B60J 7/00
(52) U.S. Cl. .................................. 296/216.08; 296/210
(58) Field of Search ............................. 296/210, 216.08

(56) References Cited

U.S. PATENT DOCUMENTS 4,355,845 A * 10/1982 Ziegler et al. .............. 296/210
4,595,230 A * 6/1986 Russell et al. .......... 296/210 X
4,957,326 A * 9/1990 Chiba et al. ................. 296/210

FOREIGN PATENT DOCUMENTS

DE     2929689   * 2/1981  ................. 296/210
DE    19709016   * 2/1998

* cited by examiner

*Primary Examiner*—Dennis H. Pedder
(74) *Attorney, Agent, or Firm*—Carlson, Gaskey & Olds

(57) ABSTRACT

A vehicle roof module (2) with integral sunroof unit for mounting on a bodywork frame (16) is proposed, in which the sunroof frame (5) is attached to the inner shell (11) at a plurality of spaced points distributed around the roof opening (3) of the sunroof unit by means of elements (21) provided only at these points and connected firmly therewith. The inner shell (11) may be attached to the bodywork frame (16) in the same way as the sunroof frame (5) is attached to the inner shell (11).

12 Claims, 2 Drawing Sheets

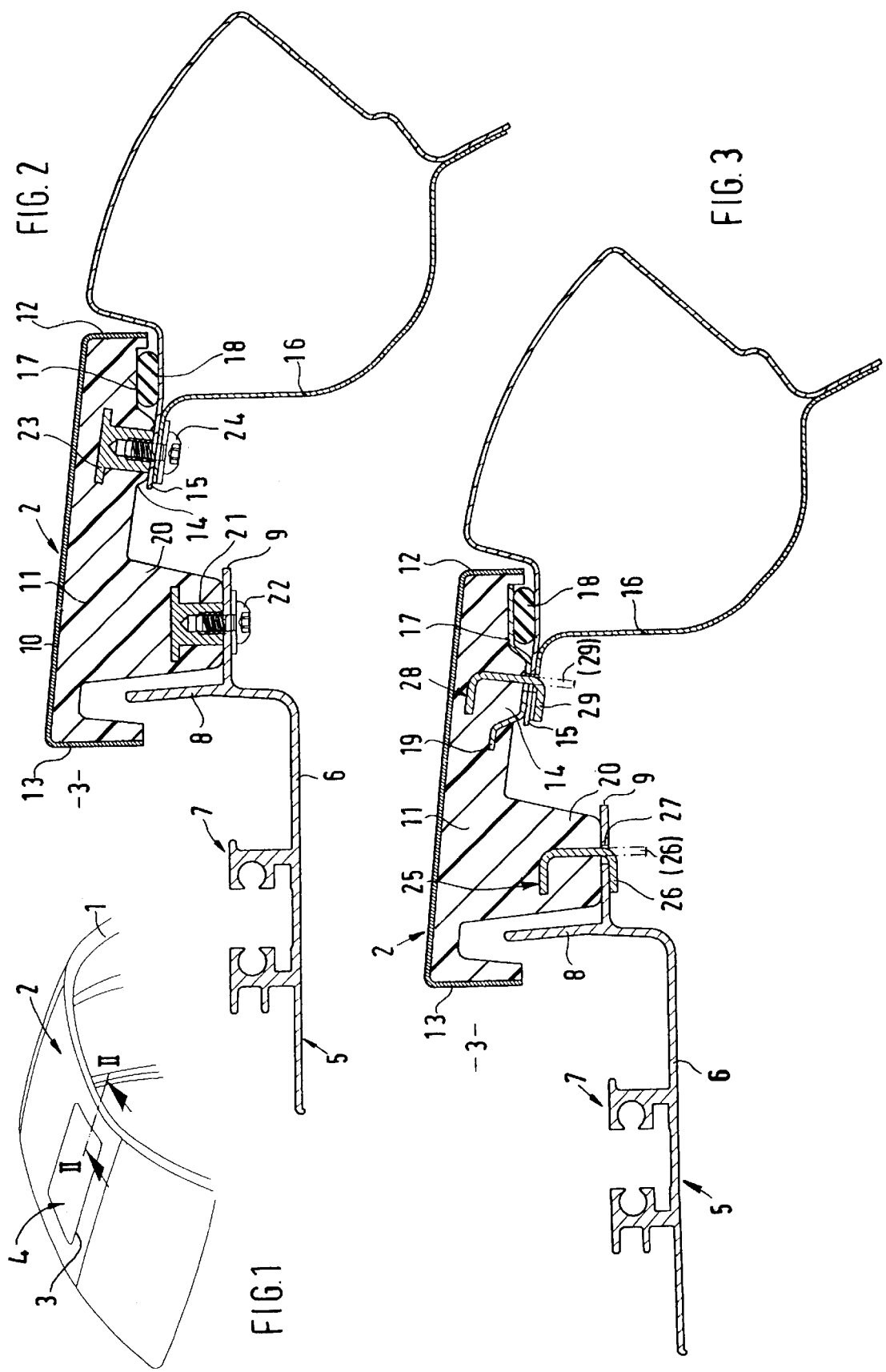

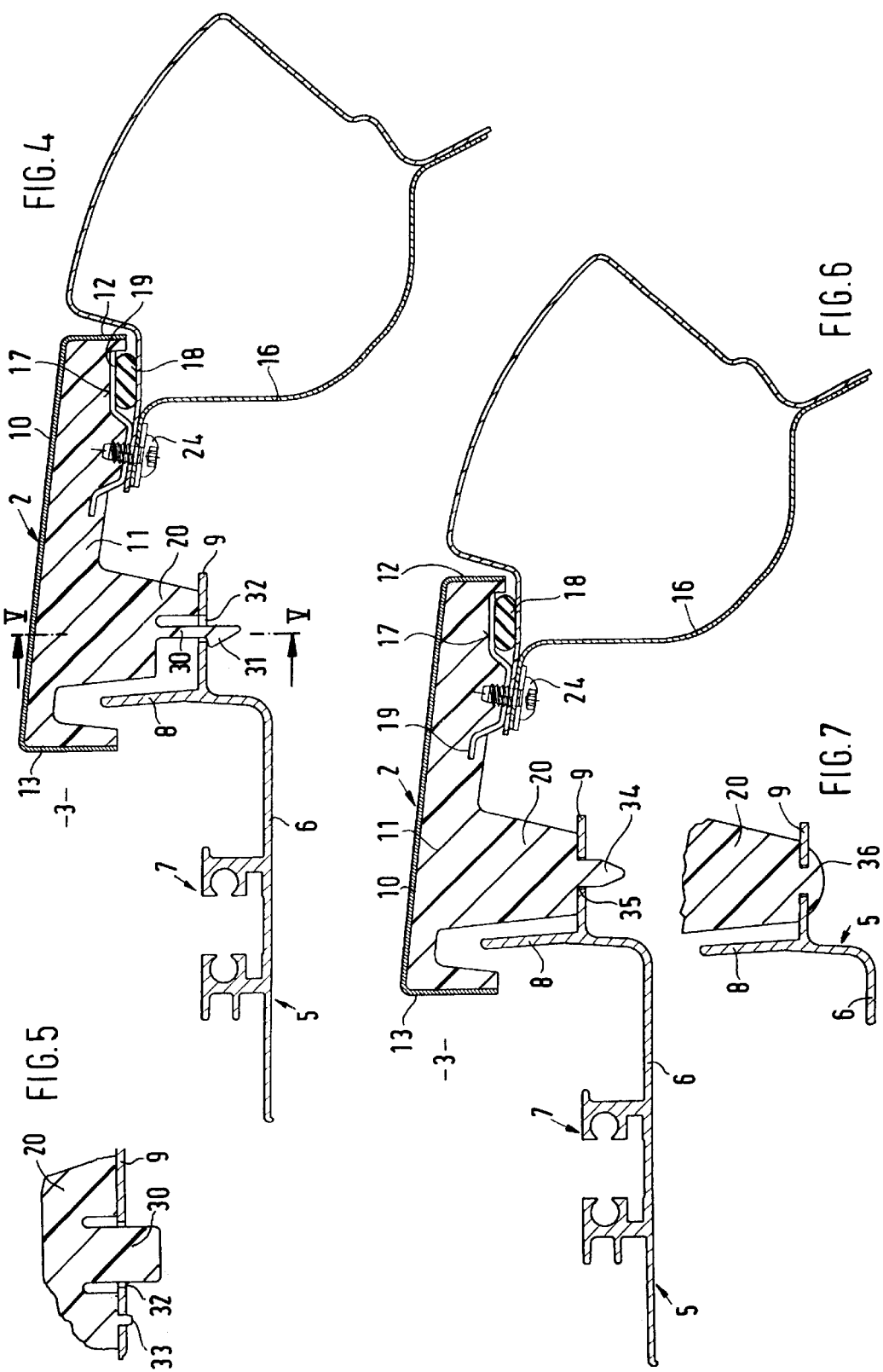

VEHICLE ROOF MODULE WITH INTEGRAL SUNROOF UNIT

BACKGROUND OF THE INVENTION

The invention relates to a vehicle roof module, in particular for motor vehicles.

Vehicle roof modules which are made separately from the vehicle bodywork and only connected with the vehicle bodywork on the assembly belt at the car factory are becoming increasingly popular in particular owing to a considerable reduction in assembly times on the assembly belt. If such vehicle roof modules are provided with an integral sunroof unit, separate manufacture opens up the advantageous possibility of checking functioning of the preassembled sunroof unit before the roof module is connected with the bodywork.

In the case of a known vehicle roof module of this type (DE 197 09 016 A1, FIGS. 9, 11), a reinforcing frame surrounding the roof opening is foamed into the plastics foam of the inner shell in such a way that the sunroof may be attached thereto. This construction fulfils all requirements with regard to strength and performance. However, vehicle roof modules of the construction in question need also to be as lightweight as possible, without suffering any loss in strength and/or performance, in order to reduce the weight of the vehicle and assist in handling of the vehicle roof module.

The object of the invention is therefore to provide a vehicle roof module of the type indicated above, having an integral sunroof unit and a comparatively low weight.

SUMMARY OF THE INVENTION

This object is achieved according to the invention by a vehicle roof module having a sunroof frame attached to an inner shell at a plurality of points around the roof opening by elements present only at these points and connected firmly therewith.

It was found that, when the features according to the invention are applied, foaming-in of a reinforcing and stiffening frame into the inner shell at the periphery of the roof opening, which frame increases the weight of the roof module, may be omitted because, in the construction according to the invention, on the one hand the inner shell foamed onto the rigid roof skin, in particular if said inner shell is provided with a fiber reinforcement or the like dispersed in the plastics foam, and on the other hand the sunroof frame, after attachment thereof according to the invention, reinforce and stiffen the roof module sufficiently in the area of the roof opening.

The term "sunroof", used here alone or in phrases, is intended, for the purposes of the present invention, to cover not only designs in which the cover may be slid under the fixed rear roof surface to uncover the roof opening after lowering of its rear edge but also sliding/lifting sunroofs, in which the cover may additionally be swivelled from its closed position about a swivel axis provided in the vicinity of its front edge so as to project above the fixed roof surface. Front-hinged covers of the ventilation shutter type and sliding sunroofs in which the cover may be slid partially over the rear fixed roof surface to uncover the roof opening after lifting of its rear edge are also included. This applies to all designs comprising a sunroof frame attached beneath the fixed roof surface.

Various embodiments are proposed for the construction of the fastening elements. Thus, in some embodiments, the elements may consist of threaded elements foamed into the inner shell, onto which elements a flange of the sunroof frame is screwed. These threaded elements may comprise either internal or external threads, such that the sunroof frame is screwed on by means of either screws or nuts.

In some other embodiments there are metal ties foamed into the plastics foam of the inner shell, which ties have bendable tongues which pass through corresponding openings in a flange of the sunroof frame. The bendable tongues are bent round behind the flange, thereby pressing the flange against the inner shell. These fastening elements allow particularly quick assembly of the sunroof frame.

Some further embodiments dispense with separate or separately foamed-in fastening elements, by forming the elements from the plastics foam of the inner shell itself during back-filling of the rigid roof skin with foam, such that they are in one piece with the inner shell, and fixing the sunroof frame to the inner shell by passing said elements through corresponding openings in the flange of the sunroof frame. In a first variant, which also allows quick assembly of the sunroof frame, said fixing is achieved by providing the relevant foamed elements with a clip-type construction, such that they may snap in resiliently behind the flange. In a second variant, the foamed elements are constructed as hot rivets, wherein the elements are provided with a rivet head formed by heating and upsetting after passage through the openings in the flanges.

To achieve attachment of the sunroof frame to the inner shell with simultaneous provision of the necessary spacing of the sunroof frame from the fixed roof skin, it is not necessary to increase the thickness of the entire inner shell of the roof module in the area of the roof opening, but instead, it can be sufficient to provide the inner shell with pedestal elements at the attachment points, which pedestal elements are formed from the plastics foam during back-filling of the fixed roof skin with foam and against which the sunroof frame lies with its fastening flange. The fastening elements are then arranged on these pedestal elements. These pedestal elements do not have to take the form of continuous ribs or the like, foamed material-saving rib portions or even peg-shaped elements at the attachment points being sufficient to achieve reliable, roof module-stiffening attachment of the sunroof frame.

As a continuation of the concept of simplified attachment, the inner shell of the roof module may be attached to the bodywork frame in the same way as the sunroof frame is attached to the inner shell.

BRIEF DESCRIPTION OF THE DRAWINGS

Further details of the invention are described in more detail with reference to the Figures, which illustrate various embodiments, in part schematically, and in which:

FIG. 1 is a perspective view of the roof area of a motor vehicle,

FIG. 2 shows a cut away section, along line II—II of FIG. 1, relating to a first embodiment, FIG. 3 shows a cut away section, along line II—II of FIG. 1, relating to a second embodiment, FIG. 4 shows a cut away section, along line II—II of FIG. 1, relating to a first variant of a third embodiment, FIG. 5 shows a cut away section along line V—V of FIG. 4, FIG. 6 shows a cut away section along line II—II of FIG. 1, relating to a second variant of the third embodiment, the sunroof frame being as yet unattached and FIG. 7 shows a detail of the section of FIG. 6, but with sunroof frame attached.

DETAILED DESCRIPTION OF PREFERRED EMBODIMENTS

FIG. 1 shows a vehicle roof module 2 already mounted on the vehicle bodywork 1, the sliding cover 4 of a sunroof unit being shown in the roof opening 3 of said module in the closed position. In FIGS. 2, 3, 4 and 6, which show the various embodiments and variants, for the sake of simplicity only the frame 5 of the sunroof unit is shown, and not the sliding cover 4 constructed as a glass or sheet metal cover, and the driving and operating elements of the sunroof unit are also omitted, because the details of this part of the sunroof unit is not necessary for understanding the present invention and may be constructed as per the prior art.

The sunroof frame 5, which is shown cut away and may be made in one or more pieces from an extruded aluminium profile, has a base web 6, on which a guide rail 7 is located, which, in a known manner, guides the sliding cover 4 and also actuating elements, not shown, by means of which the sliding cover 4 is driven so as to be displaceable relative to the roof opening 3. On an edge web 8 extending approximately perpendicularly upwards from the base web 6 there is located a fastening flange 9 projecting approximately horizontally outwards therefrom.

The roof module 2 consists of an outer shell or roof skin 10 made of a metallic material, e.g. aluminium or steel sheet, or of a plastics sheet and an inner shell 11 connected therewith in the manner of a sandwich, which inner shell 11 is made of a plastics foam, for example a PU foam, and is connected firmly to the inner surface of the roof skin 10 by being foamed thereon. The inner shell 11 extends as far as an outer circumferential bent portion 12 of the roof skin 10 and also as far as an inner bent portion 13 defining the roof opening 3. All the shaped portions of the inner shell 11 are formed in the foaming mould during foaming of the plastics onto the roof skin 10.

The inner shell 11 is provided, in the vicinity of the outer edge of the roof module 2, with a downwardly projecting circumferential rib 14, by means of the lower surface of which the roof module 2 is positioned on and attached to an inwardly directed flanged edge 15 of the bodywork frame 16. Between the rib 14 and the outer bent portion 12, there is located a circumferential groove 17 for accommodating an adhesive bead 18 or a seal inserted therein, whereby the necessary seal between roof module 2 and bodywork frame 16 is achieved. In the embodiments shown in FIGS. 3, 4 and 6, reinforcing sheets 19 are foamed onto the inner shell 11 in the area of the rib 14 and the groove 17, following the contours thereof.

In addition, the inner shell 11 has downwardly projecting pedestal elements 20 formed from the plastics foam of the inner shell 11 in the vicinity of the inner bent portion 13 at the points of attachment of the sunroof frame 5, the lower surface of which pedestal elements 20 is adjoined by the fastening flange 9 of the sunroof frame 5. These pedestal elements 20 may be of rib-type, rib portion-type or even peg-type construction, wherein the outer faces in each case extend at angle one to the other, in order to assist in removing the roof module 2 from the foaming mould. According to the exemplary embodiments, the sunroof frame 5 is attached to the pedestal elements 20 in various ways, as will be described below.

In the first embodiment according to FIG. 2, the fastening elements are threaded nuts 21 foamed into the pedestal elements 20, i.e. surrounded completely by the plastics foam of the inner shell 11 except for their lower faces, wherein screws 22 passing through the fastening flange 9 of the sunroof frame 5 are screwed into said nuts 21. Corresponding fastening elements are provided between the bodywork frame 16 and the roof module 2, threaded nuts 23 being foamed into the inner shell 11 in the area of the rib 14, wherein only the lower faces of the threaded nuts 23 are revealed. Screws 24 passing through the flanged edge 15 of the bodywork frame 16 are screwed in each case into the threaded nuts 23.

The second embodiment shown in FIG. 3 uses as fastening elements metal ties 25 foamed into the pedestal elements 20, which metal ties 25 each for example originally take the form of an angled sheet metal profile, the shorter branch of which and a considerable portion of the longer branch of which are foamed into the plastics foam of the inner shell 11, while the longer branch projects downwards from the pedestal element 20 and forms a bendable tongue 26. The bendable tongues of the metal ties 25 are passed through corresponding openings 27 in the fastening flange 9 of the sunroof frame 5, i.e. the sunroof frame is pushed onto the initially still straight bendable tongues 26 by means of the openings 27. Then, the bendable tongues are bent round behind the fastening flange 9, pressing the flange against the inner shell 11 or the pedestal element 20. In this second embodiment, corresponding fastening elements may also be provided between the bodywork frame 16 and the roof module 2, metal ties 28 being foamed into the inner shell 11 in the area of the rib 14, which ties again project with a bendable tongue 29 in this case initially straight downwards through an opening in the reinforcing sheet 19. When the roof module 2 is positioned on the flanged edge 15 of the bodywork frame 16, the bendable tongues 29 project through corresponding openings in the flanged edge 15 and are bent round behind the flanged edge 15 until they lie thereagainst, thereby pressing the roof module against the flanged edge 15.

The two variants of the third embodiment illustrated in FIGS. 4 to 6 have in common the fact that the fastening elements comprise projections formed from the plastics foam of the inner shell 11 itself and are thus in one piece, said projections passing in each case through a corresponding opening in the fastening flange 9 of the sunroof frame 5 and engaging in various ways behind the fastening flange 9, in order to press the flange against the inner shell 11, i.e. against the pedestal element 20.

In the variant shown in FIGS. 4 and 5, the projections 30 are of laterally resilient construction and engage in each case behind the fastening flange 9 by means of a hooked lug 31, when the hooked lug 31 has in each case passed through the respective opening 32 in the fastening flange. The projections 30 and the hooked lugs 31 are so constructed and arranged relative to the openings 32 that the sunroof frame 5 is locked clip-wise to the inner shell 11. In order to ensure accurate positioning between sunroof frame 5 and inner shell 11, locating pins 33 may be provided on the pedestal elements 20, which engage in corresponding locating holes in the fastening flange 9, as shown in FIG. 5.

In the second variant of the third embodiment shown in FIGS. 6 and 7, the projections 34 of the pedestal element 20 are initially of substantially cylindrical form and each engage in a corresponding opening 35 in the fastening flange 9. Once the sunroof frame 5 has been positioned on the projections 34, the latter are heated and deformed to produce a head 36 of increased thickness, which cannot pass through the opening 35. In this manner, the sunroof frame 5 is attached to the inner shell 11 by means of hot rivets.

In the two variants of the third embodiment, the respective inner shells of the roof module may again be attached to the bodywork frame in the same manner as the sunroof frame is attached to the inner shell. However, FIGS. 4 and 6 show screw fastenings, in which screws 24 pass through the flanged edge 15 of the bodywork frame and engage with threads in the reinforcing sheets 19.

The inner liner generally present in sunroofs and the trim conventionally provided on the bodywork frame 16 were not illustrated in the drawings for reasons of simplicity. The inner liner and trim may be formed in one piece from a plastics foam, as shown in FIGS. 9 and 11 of DE 197 09 016 A1.

A vehicle roof module with integral sunroof unit for mounting on a bodywork frame is proposed, in which no weight-increasing reinforcing frame or the like for attachment of the sunroof frame is foamed into an inner shell foamed from plastics foam onto a rigid roof skin, but instead the sunroof frame is attached to the inner shell at a plurality of spaced points distributed around the roof opening of the sunroof unit by means of elements present only at these points and connected firmly therewith. The inner shell may be attached to the bodywork frame in the same way as the sunroof frame is attached to the inner shell.

Whilst the invention has been described and illustrated by way of preferred embodiments of the invention, it will be understood to those skilled in the art that various changes in form and detail may be made without departing from the spirit and scope of the invention as defined in the appended claims.

What is claimed is:

1. A vehicle roof comprising:
    a roof skin comprising an inner surface with an inner shell of plastics foam foamed on said inner surface,
    the roof being positionable on and firmly connectable to vehicle bodywork,
    the roof further comprising all opening in the roof skin closable by a sliding cover of a sunroof and a frame beneath the roof skin for mounting and guiding operating elements of the sunroof,
    wherein said frame is attached firmly to said inner shell at a plurality of spaced downwardly projecting pedestals distributed around said opening by fastenings present only at said downwardly projecting pedestals, such that said fastenings and said inner shell cooperate to provide the exclusive support for said frame.

2. A vehicle roof module that is manufactured separately from other vehicle body parts and is positionable to be connected with the other vehicle body parts, comprising;
    a rigid roof skin having a roof opening;
    an inner shell of plastic foam that is secured onto an inner surface of the rigid roof skin;
    a cover that is moveable into a position to close the roof opening;
    a cover frame that supports and guides operating parts associated with the cover; and
    a plurality of fastening elements supported by the inner shell at a plurality of spaced downwardly projecting pedestals near the roof opening, the cover frame being secured to the inner shell by the fastening elements at the spaced downwardly projecting pedestals such that the inner shell supports the cover frame.

3. The roof module of claim 2, wherein the fastening elements are threaded elements foamed into the plastic foam of the inner shell and wherein the cover frame includes a flange that is secured in place by the threaded elements.

4. The vehicle roof module of claim 2, wherein the fastening elements comprise metal members foamed into the plastic foam of the inner shell, the metal members projecting out of the plastic foam and having a bendable tongue that passes through a corresponding opening in a flange of the cover frame, the tongues being bent adjacent the flange to thereby secure the flange against the inner shell.

5. The vehicle roof module of claim 2, wherein the fastening elements comprise projections that are part of the plastic foam of the inner shell and are one piece with the inner shell, each projection passing through a corresponding opening in a flange of the cover frame and engaging the flange to thereby secure the flange against the inner shell.

6. The vehicle roof module of claim 5, wherein the projections have a laterally resilient construction and a lug portion that engages the flange.

7. The vehicle roof module of claim 5, wherein the projections are deformed adjacent to the flange to thereby form a head that is larger then a corresponding opening in the flange.

8. The vehicle roof module of claim 2, wherein the downwardly projecting pedestals are formed from the plastic foam at the point of attachment of the cover frame, the cover frame lying against said pedestals.

9. A vehicle roof module that is manufactured separately from other vehicle body parts and is positionable to be connected with the other vehicle body parts, comprising:
    a rigid roof skin having a roof opening;
    an inner shell of plastic foam that is secured onto an inner surface of the rigid roof skin;
    a cover that is moveable into a position to close the roof opening;
    a cover frame that supports and guides operating parts associated with the cover, and
    a plurality of fastening elements that secure the cover frame to the inner shell at a plurality of spaced downwardly projecting pedestals near the roof opening such that the fastening elements and the inner shell cooperate to provide the exclusive support for the frame.

10. The vehicle roof module of claim 9, wherein the fastening elements are formed as part of the inner shell.

11. The vehicle roof module of claim 9, wherein the fastening elements are received through a flange portion on the frame and are secured to the inner shell.

12. The vehicle roof module of claim 11, wherein the flange portion of the frame has two sides, the fastening elements contacting a first one of the sides and extending through the flange, the other side of the flange contacting only the inner shell.

* * * * *

UNITED STATES PATENT AND TRADEMARK OFFICE
CERTIFICATE OF CORRECTION

PATENT NO. : 6,409,258 B1
DATED : June 25, 2002
INVENTOR(S) : Grimm et al.

It is certified that error appears in the above-identified patent and that said Letters Patent is hereby corrected as shown below:

Column 5,
Line 38, "all" should be -- an --

Signed and Sealed this

Thirty-first Day of December, 2002

JAMES E. ROGAN
*Director of the United States Patent and Trademark Office*